United States Patent
Miller

[11] Patent Number: 5,971,668
[45] Date of Patent: Oct. 26, 1999

[54] PORTABLE ANCHOR AND METHOD FOR RELEASABLY ANCHORING TO A ROCK

[76] Inventor: Ronald D. Miller, 1977 N. Meridian Rd., Chana, Ill. 61015

[21] Appl. No.: 09/073,675

[22] Filed: May 6, 1998

[51] Int. Cl.[6] .................................................. E21D 20/00
[52] U.S. Cl. ........................ 405/259.1; 405/244; 182/3; 119/770
[58] Field of Search ................ 405/244, 259.1, 405/259.2, 259.3, 259.4; 52/153, 166; 248/507, 508, 499, 925; 182/3; 119/770, 786, 787, 789

[56] References Cited

U.S. PATENT DOCUMENTS

| | | | |
|---|---|---|---|
| 91,042 | 6/1869 | Raiford . | |
| 227,675 | 5/1880 | Carnes et al. . | |
| 244,843 | 7/1881 | Battelle . | |
| D. 245,032 | 7/1977 | Hoffmann . | |
| 249,904 | 11/1881 | Covert . | |
| 383,884 | 6/1888 | Hutchinson | 405/244 |
| 1,092,036 | 5/1914 | Fry . | |
| 1,268,459 | 6/1918 | Hjermstad . | |
| 1,456,627 | 5/1923 | Delbridge . | |
| 1,516,489 | 11/1924 | Barton | 248/499 X |
| 2,087,176 | 3/1937 | Webb . | |
| 2,472,926 | 6/1949 | Sullivan | 119/786 |
| 2,525,890 | 10/1950 | Gage . | |
| 2,812,743 | 11/1957 | Dustin . | |
| 3,100,476 | 8/1963 | Peak . | |
| 3,508,525 | 4/1970 | Sawyer . | |
| 3,658,037 | 4/1972 | Hunter . | |
| 3,921,589 | 11/1975 | McGahee . | |
| 4,056,036 | 11/1977 | Kamann et al. | 52/573 X |
| 4,621,946 | 11/1986 | Page | 405/211 X |
| 4,800,843 | 1/1989 | Wendling . | |
| 4,831,798 | 5/1989 | Otteson . | |
| 4,951,778 | 8/1990 | Halvorson | 182/9 |
| 4,982,701 | 1/1991 | Papak . | |
| 5,004,071 | 4/1991 | Mallard et al. | 182/3 |
| 5,011,106 | 4/1991 | Cody | 182/3 |
| 5,044,323 | 9/1991 | Papak | 119/770 |
| 5,161,487 | 11/1992 | Miller . | |
| 5,607,029 | 3/1997 | Beckham | 182/3 |
| 5,730,407 | 3/1998 | Ostrobrod | 182/3 |
| 5,785,007 | 7/1998 | Sauber et al. | 119/786 X |
| 5,785,742 | 6/1998 | Chiou et al. | 182/3 |

Primary Examiner—David Bagnell
Assistant Examiner—Jong-Suk Lee
Attorney, Agent, or Firm—Keith Frantz

[57] ABSTRACT

A portable anchor for tethering to on the shelf of a rock quarry includes an elongated lower post adapted into slip charge holes drilled in the quarry shelf, a stop plate connected to the post and rotatably resting on the shelf, and hook receiving means for connection of one end of a tether line that is connected at the other end to a harness or belt worn by the worker. A method for anchoring to said quarry shelf includes providing an anchor adapted to slip into the charge receiving holes formed in the shelf, and having a stop plate for positioning the depth of the anchor in the charge hole.

14 Claims, 4 Drawing Sheets

FIG. 3
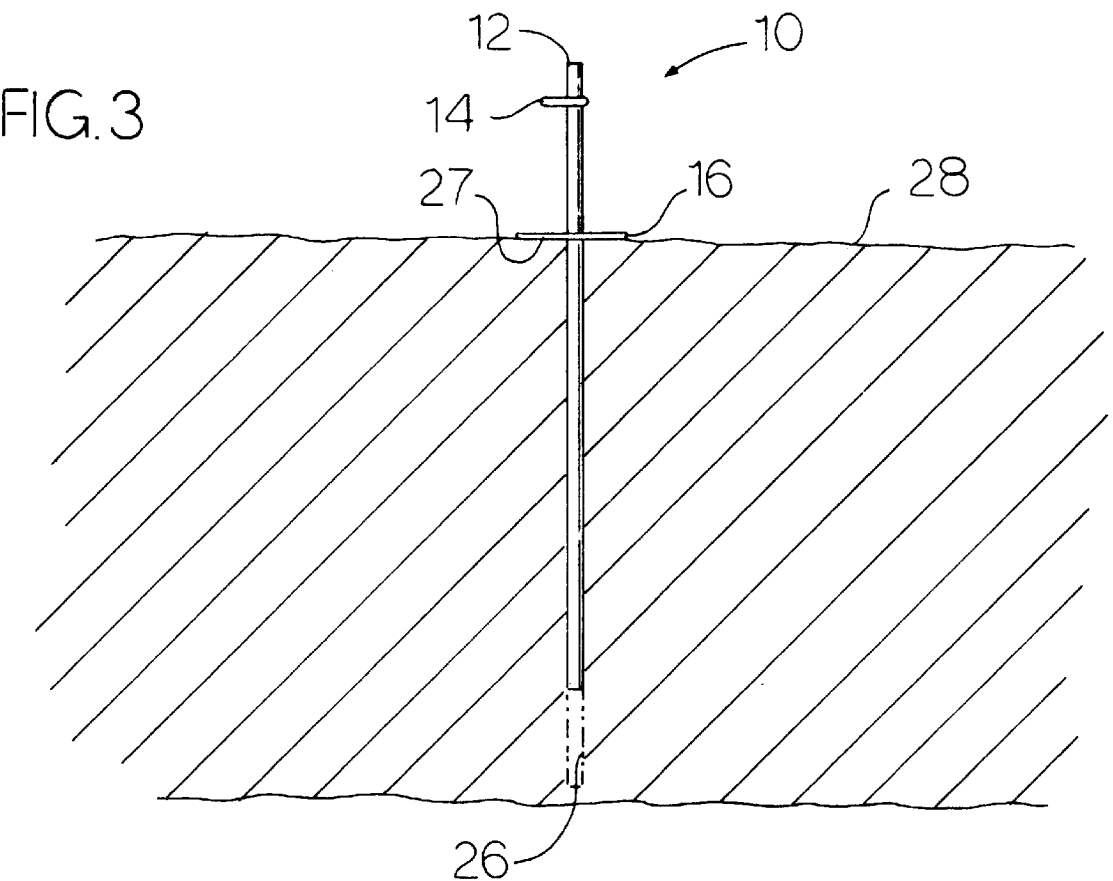
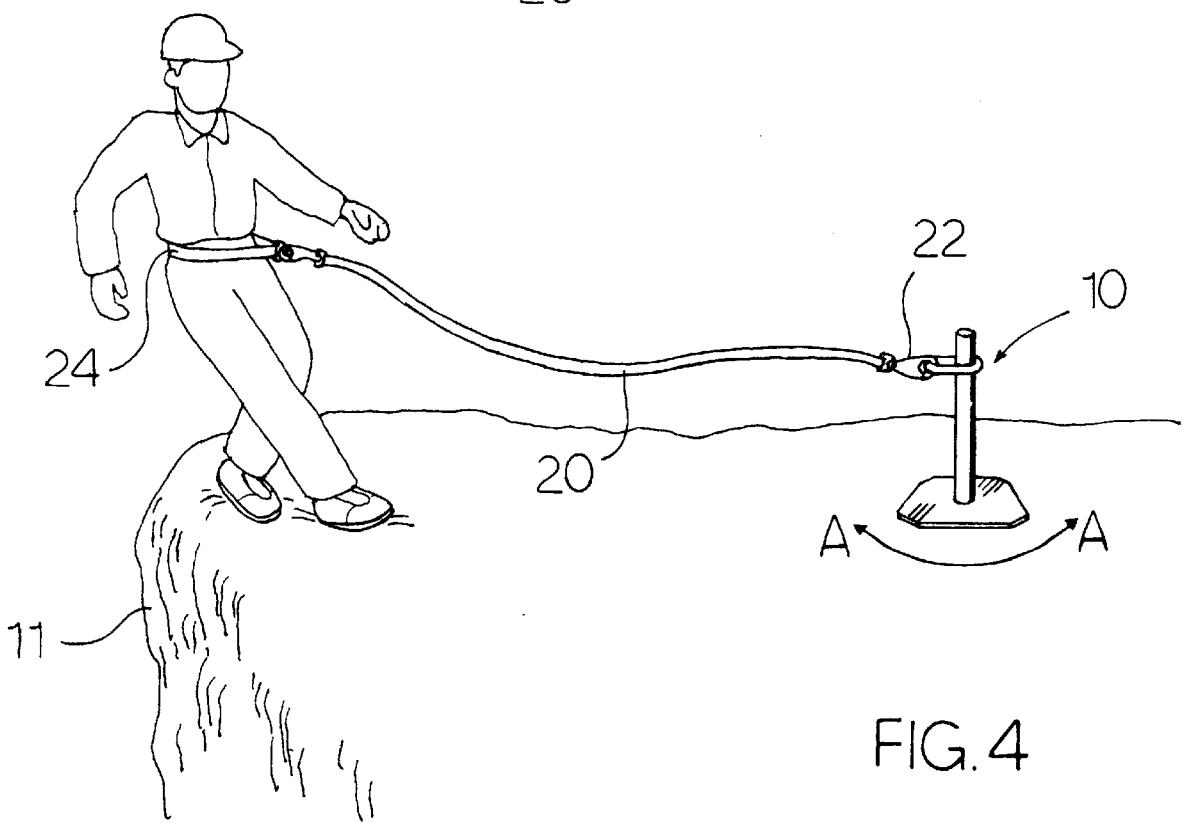
FIG. 4

PORTABLE ANCHOR AND METHOD FOR RELEASABLY ANCHORING TO A ROCK

BACKGROUND OF THE INVENTION

The present invention relates generally to safety equipment, and more particularly to anchors and methods associated therewith adapted to secure rock quarry workers when working near the edge of a quarry floor or deck.

Rock is removed from a quarry using well-known blasting methods, one of which includes removing rock from the face of a rock shelf to depths in the neighborhood of 50–60 feet. To prepare the edge portion of a rock shelf for blasting, vertically extending charge holes or "boreholes" are drilled into the floor or deck of the shelf, explosive charges are placed into the holes, and the explosives detonated for removal of the face or edge portion of the shelf. For these and other reasons associated with rock blasting, workers are sometimes required to work relatively close to the edge of the shelf.

Various laws, regulations, ordinances and the like, including those of the U.S. Department of Labor— Mine Safety and Health Administration, require that workers be anchored to a stationary object whenever they may come within a certain distance, e.g., within 5 feet, of the edge of the quarry floor, so as to hold the worker if he falls off the edge of the shelf, thus preventing the worker from falling to the next lower shelf and often to the worker's death. For this reason, such workers are typically equipped with a safety belt or other harness arrangement that fits snugly around the waist area of the worker's body, and a tether line or safety strap, typically 10–15 feet in length, that hooks between the worker's safety belt and the stationary object the worker is anchoring to.

It has been common practice for a worker in this situation to anchor himself to a vehicle or heavy piece of machinery that is located nearby on the quarry shelf. For example, workers will often anchor themselves to a truck or a mobile drilling rig. However, such vehicles or machinery may not be immediately available in the area that the worker desires to go, and the worker must move the vehicle or machinery to the desired area before he can safely proceed into that area. Unfortunately workers do not always take the time to move a vehicle or machinery to a location for tethering to.

Prior techniques for anchoring to the quarry shelf have also included drilling a relatively shallow hole in the rock, e.g., 3–4 feet, and inserting a steel anchoring post into the hole. In this instance, the steel post is sized to rest on the bottom of the hole and extend to a height above the quarry floor, the upper end of the post being provided with a hook arrangement for connecting with the safety strap.

Of recent times, the Federal Mine Safety and Health Administration has discouraged the practice of workers anchoring to vehicles, mobile drilling rigs, and like equipment, because if such equipment falls from the shelf, as it does upon occasion, a tethered worker will be pulled over the edge with the machinery. This has resulted in increased use of the shallow-holes/steel post anchoring arrangement. Unfortunately, such posts are not easily portable as they are relatively heavy, and such an arrangement requires drilling holes in the rock in addition to the charge holes that are already drilled or to be drilled in the rock, resulting in additional time and expense associated with quarry work.

Thus, it is desirable to provide a lightweight, portable anchor that is suitable for use in a quarry, to enable the worker to quickly and easily carry the anchor to a desired location as he does his safety harness, and to easily move the anchor from place to place as the need arises for increased ease of worker mobility on the cliff. It is further desirable to provide such a portable, lightweight anchor that is suitable for use on a quarry shelf without the need to drill additional holes in the rock.

SUMMARY OF THE INVENTION

The general aim of the present invention is to provide new and improve anchor apparatus and methods associated therewith for use by workers in a rock quarry.

A detailed objective is to achieve the foregoing by providing a lightweight, portable anchor that is adapted for use in a quarry to enable the worker to move the anchor from place to place as the need arises.

Another objective of the invention is to provide such a portable, lightweight anchor that is suitable for installation into the vertical charge holes that are or will be formed in the rock shelf for eventual placement of explosive charges, thus eliminating the time and expense associated with the prior practice of drilling additional holes.

These and other objectives and advantages of the invention will become more apparent from the following detailed description when taken in conjunction with the accompanying drawings.

In general, the preferred anchor of the present invention includes (1) an elongated, tubular, aluminum post or stake member adapted to slip into the charge holes drilled into the rock, (2) a plate or stop member connected to the upper portion of the stake member and sized larger than the diameter of the charge holes so as to position the stake member to a predetermined depth in the rock, and (3) hook receiving means connected above the stop member to enable connection between the anchor and the hook on one end of the worker's safety line. In keeping with the preferred embodiment, the lower stake member, the stop member, and the hook receiving means are securely connected together, and the stop member is formed with a flat bottom for relative ease of rotation on the hard rock surface such that the entire anchor is free to rotate as the worker moves around the quarry shelf.

BRIEF DESCRIPTION OF THE DRAWINGS

FIG. 3 is a side elevational view of the anchor as seen installed in a charge hole formed in rock shelf, the rock being broken-away and shown in cross-section to expose the details of the anchor.

FIG. 4. is a perspective view of a person connected to the anchor with a conventional safety belt and tether line.

Figure 1:
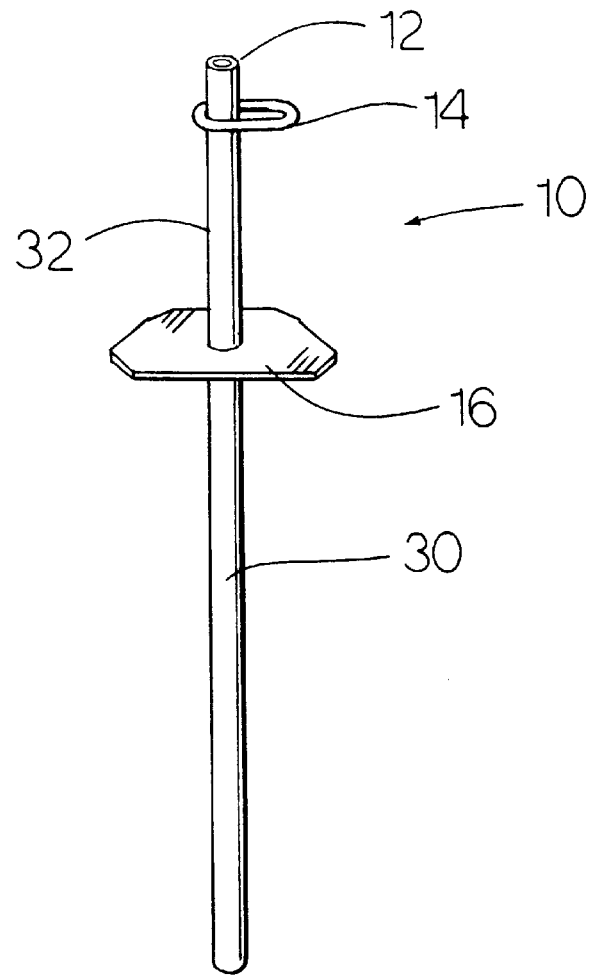
FIG. 1 is a perspective view of a new portable anchor incorporating the unique aspects of the present invention.
Figure 2:
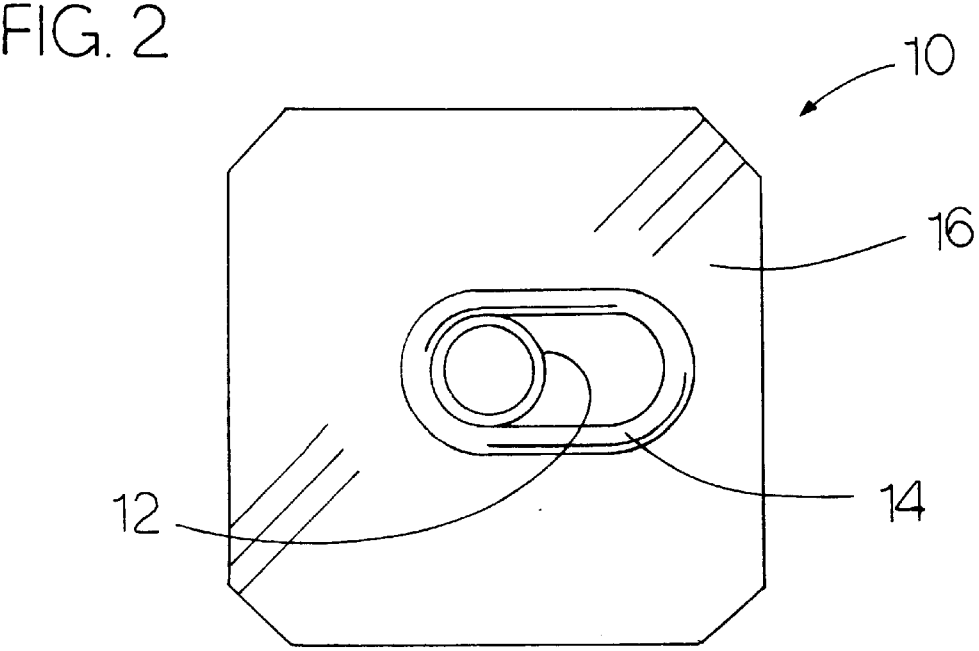
FIG. 2 is a top plan view of the anchor of FIG. 1.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

For purposes of illustration, the present invention is shown in the drawings as embodied in an anchor 10 (FIG. 1) adapted to anchor a worker (FIG. 4) to the top of a rock shelf in a rock quarry.

Explosive charges (not shown) are placed into relatively deep holes 26 (FIG. 3) for removing a section of a rock face 11 (FIG. 4) during conventional quarry blasting. These charge holes 26 or "boreholes" are drilled downwardly from the upper surface 28 of the shelf to the depth of the desired rock removal, and are spaced along the shelf, typically in a crisscross pattern, at a predetermined spacing for removal of the rock by the detonation of the charges. In drilling these charge holes, placing the charges, and performing other work, quarry workers and blasting personnel are often in a position that is relatively close to the edge of the cliff.

Quarry workers are typically required to be anchored or tethered to a stationary object any time they may be working within a certain distance (e.g., 5 feet) from the rock face 11. Thus, standard equipment for a quarry worker includes a harness or safety belt 24 that fits snugly around the worker's waist, and a flexible safety strap or tether line 20 equipped with safety hooks 22 at each end for releasably connecting between the safety belt and the stationary object. In this way, if the worker should slip off the edge of the shelf, such as by walking onto an unstable portion of rock, the stationary object will keep the worker from falling to the bottom of the quarry.

In accordance with the present invention, the anchor 10 is a lightweight portable anchor that is uniquely adapted to slip into the charge holes 26 that have been or will be drilled into the rock shelf for eventual placement of the explosive charges. As a result, a worker can anchor himself to the rock by utilizing equipment that is easily portable and without the need to drill additional holes into the rock.

More specifically, the anchor 10 includes:

an elongated stake or first post member 30 (FIG. 1) sized to slip into the charge holes 26, and to extend for a substantial length (e.g., 4 feet) into such holes;

a stop member 16 connected to the upper portion of the post member 30, the stop member being and sized larger than the diameter of the charge holes 26 so as to position the post member 30 to said predetermined depth therein; and hook receiving means 14 connected above the stop member 16 for connection of a hook 22 of the safety line 20.

With this arrangement, a worker can securely anchor himself to the rock by simply positioning the anchor 10 into a charge hole 26 in the vicinity of the location that he desires to work by lowering the post member 30 into the hole until the stop member 16 rests on the top surface 28 of the rock, connect one hook 22 of the safety line to the hook receiving means 14, and connect the other hook 22 to the safety belt 24 that has been or will be fastened around his waist. Moreover, the worker can move from one anchored location to another on the rock by simply sliding the anchor out of one charge hole and relocating the anchor into a charge hole in the new location.

In a preferred embodiment of the invention, the hook receiving means 14 is adapted to rotate relative to the shelf so that the worker is permitted complete freedom of movement within a circular area having a radius established by the length of the safety line 20, without the worker having to concern himself with the possibility that the tether line will wrap around the anchor.

In carrying out the preferred embodiment, the post member 30 is aluminum and tubular in cross-section so as to provide the bending strength needed to carry the weight of the worker while keeping the weight of the anchor 10 to a minimum to enhance portability, and is preferably formed with a round, relatively smooth outer surface which will allow for relative ease of rotation of the post member in the charge hole 26. In keeping with the preferred embodiment, the stop member 16 is securely connected to the upper portion of the post member 30, and is preferably formed from a plate with a flat bottom 27 so that the stop member 16 will freely rotate on the hard upper rock surface 28 of the quarry shelf. In further keeping with the preferred embodiment, the hook receiving means 14 is securely connected to the stop member 16 and the post member 30.

With this arrangement, and the entire anchor 10 will freely rotate in the charge hole and on the shelf 28 as necessary, as generally indicated by the arrow A—A in FIG. 4, as the worker moves around the quarry. Advantageously, such an arrangement (1) is inherently more reliable, due to the fact that there are no relatively rotatable parts, than arrangements with seals and associated apparatus that would be required to provide a reliable connection for hook receiving means that is rotatable with respect to the stake member or the stop member in the typically dusty and dirty environment of a rock quarry, and (2) is less expensive to manufacture than anchor arrangements with such relatively rotatable hook receiving means.

In the embodiment shown, the anchor 10 includes an elongated post 12 having a second post member or upper end portion 32 that carries the hook receiving means 14, and a lower end portion defining the stake or first elongated lower post member 30 that is positioned into a charge hole 26 for anchoring the worker to the quarry shelf. The stop member 16 is in the form of a flat plate that is secured on the post 12 between the upper and lower end portions, 32 and 30, respectively, thereof. In this instance, the plate 16 is initially formed with a centrally located through-hole (not shown) such that the post 12 slips into the through-hole, and the plate 16 is securely connected in position on the post 12 by welding or other suitable means.

The hook receiving means 14 (FIGS. 1–4) shown is in the form of an elongated ring that is preferably sized with an inside radius at one end of approximately the same size as the outer diameter of the post 12. In this instance, the ring 14 is positioned surrounding the post and is welded thereon, or otherwise securely connected thereto, so that the opposite end of the elongated ring is spaced from the post for receiving the hook 22 therebetween. Advantageously, positioning and securing the ring in this manner, against the side of the post opposite the direction of pull that the ring and post must carry in the event that the worker falls off of the shelf, substantially reduces the concern as to strength and quality of the weld in the consideration of the anchor design. In other words, the ring is trapped on the post and the weight of the worker is transferred from the ring directly to the post so that, even if the connection between the ring and post should fail, the ring will simply slip down the post to the stop plate 16 and the ring and post will safely hold the hanging worker.

In the preferred embodiment, the anchor 10 is made from aluminum material for reduced weight. Advantageously, this provides for long-term weather and corrosion resistance, and allows the use of the anchors 10 safely around explosives. More specifically, the aluminum post may be placed into a charge hole in which the explosive charges have already been placed without danger of detonation, whereas steel posts can not be used in this instance because non-sparking materials must be used in the presence of explosives. Moreover, as a result of the relatively inexpensive and corrosive resistant nature of such preferred anchors 10, numerous anchors can be purchased and positioned in the charge holes on the rock shelf for the workers to choose from for relatively long periods of time.

Figure 5:
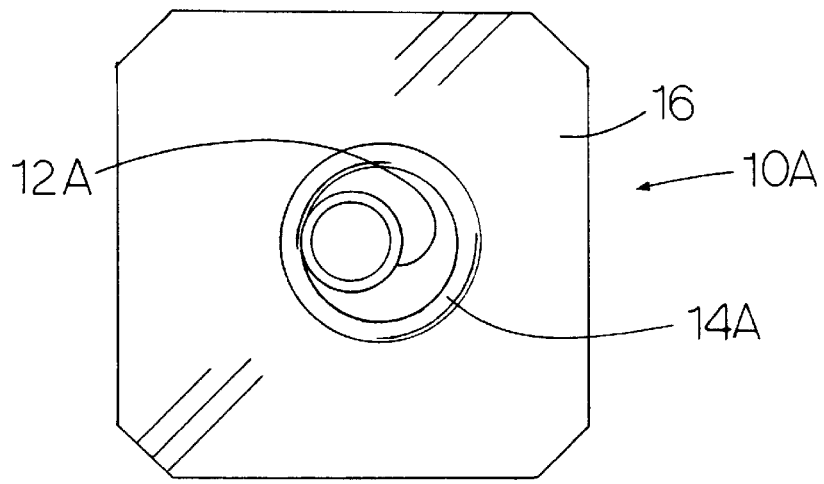
FIGS. 5 and 6 are top plan views showing of two alternate embodiments of alternate hook receiving means for anchors according to the present invention.
Figure 6:
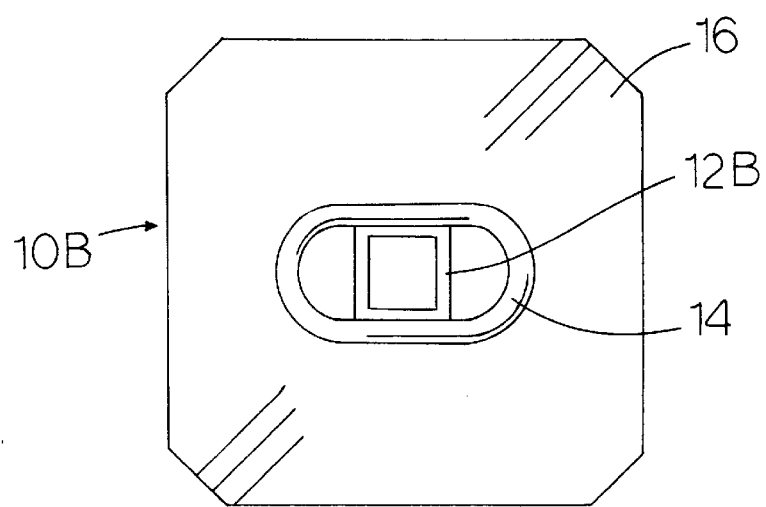
Figure 7:
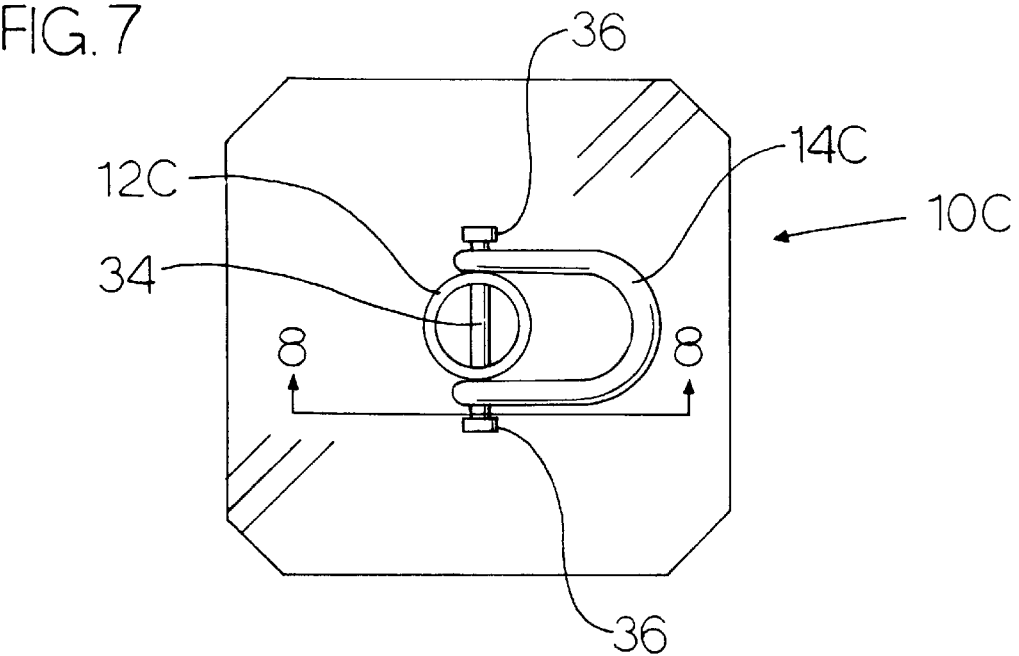
FIGS. 7 and 8 are top plan and side elevation views of yet another alternate embodiment of hook receiving means for anchors according to the present invention.
Figure 8:
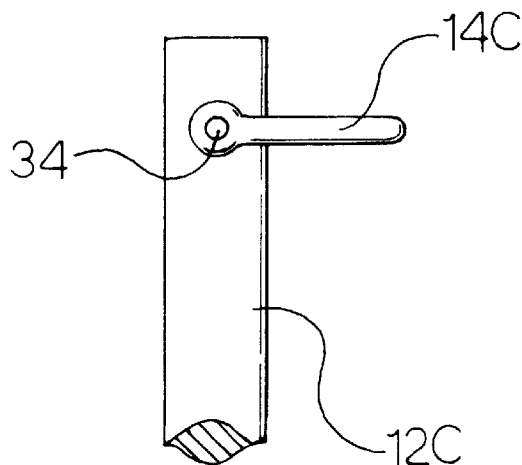
Figure 9:
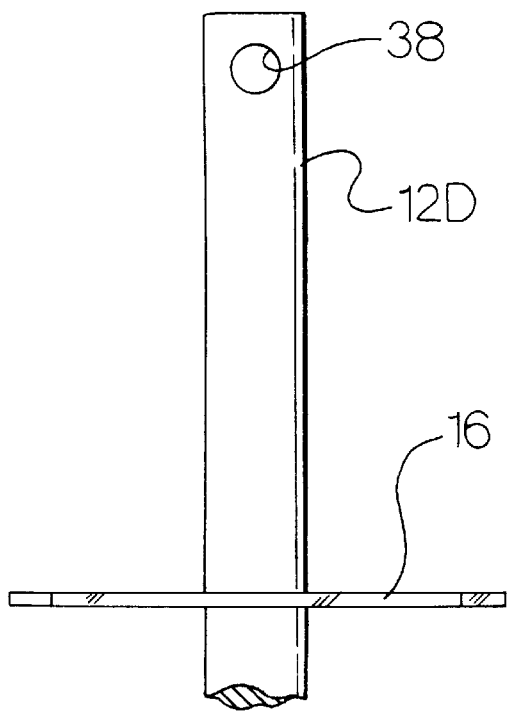
FIG. 9 is a side elevation view of still another alternate hook receiving means adapted for use with the present invention.

As will be apparent, many of the unique aspects and advantages of the present invention may be achieved through numerous alternate embodiments. For example, a circular ring 14A (FIG. 5) of alternate ancher 10A is of sufficient diameter to wrap around the post 12A and to provide space for receiving the hook 22 between the post and the inner diameter of the ring may be utilized, although such an arrangement will be more difficult to weld, and will result in increased point loading between the ring and the post. Posts, e.g., 12B, of different cross-sections, and alternate ring placement may be utilized such as the generally arrangement depicted in anchor 10B in FIG. 6 for illustrative purposes. Other known means for securely connecting the ring 14, 14A to the post may be provided such as with the use of clamps and nuts and bolts. Alternately, for example, the hook receiving means might take the form of a clevis arrangement or half-ring 14C depicted in anchor 10C in FIGS. 7 and 8 connected to the post 12C with a through pin 34 and threaded end fasteners 36. The hook receiving "ring" means might also, for example, take the form of a simple opening 38 (FIG. 9) formed in the upper end portion of the post 12D. In addition, as mentioned above, anchors with relatively rotatable hook receiving means may be utilized in practicing the methods including utilizing anchors with stop plates and lower post members slidably installed into the relatively deep charge holes 26 for anchoring to the top of the rock shelf. Although such embodiments are not preferred for the reasons discussed herein and for other reasons that will be apparent to one skilled in the art, these and other alternate embodiments are clearly with the scope of the contemplated inventive apparatus and methods for securely anchoring a quarry worker.

From the foregoing, it will be apparent that the present invention brings to the art new and improved anchors and methods for use in rock quarries, whereby worker safety is promoted by virtue of the portability of the anchors, the unique preferred anchor construction that is especially suitable for the rugged quarry environment, and by the reliability and inexpensive nature of the anchors contemplated. Moreover, utilizing the charge holes 26 as contemplated provides worker safety without the expense of drilling additional holes, and with the preferred anchor, enables placement of the anchor into a charge hole without regard to whether explosives have been loaded into that charge hole.

I claim:

1. An anchor adapted for use with a flexible tether line equipped with tether hook means for releasably anchoring to a rock structure having a vertically extending opening, said anchor comprising when in said position:

an elongated post having a lower end portion for slidably inserting into said opening and having an upper end portion securely connected to said lower end portion for rotation therewith;

plate means securely connected to said post between said upper and lower end portions for rotation with said post, said plate means having a substantially flat lowermost surface extending generally perpendicular to said post for slidably engaging said structure; and hook receiving means securely connected to the upper end portion of said post for rotation therewith, said hook receiving means being adapted for receiving said tether hook means.

2. The anchor as defined in claim 1 in which said lower end portion of said post is made from non-sparking material.

3. The anchor as defined in claim 1 in which said hook receiving means comprises an opening formed in said upper end portion of said post.

4. The anchor as defined in claim 1 in which said hook receiving means includes ring means securely connected to said upper end portion of said post.

5. A method for releasably anchoring a person to a rigid structure made from rock, said structure having a generally upwardly facing surface, the method comprising the steps of:

(A) providing:
      (i) an anchor having
         (a) an elongated post member with first and second end portions,
         (b) hook receiving means connected to said first end portion, and
         (c) stop means connected to said elongated post member between said first and second end portions, and
      (ii) a harness having
         (a) a flexible tether line equipped with hook means, and
         (b) safety belt means connected to said tether line;
   (B) forming a plurality of elongated openings extending downwardly in said structure;
   (C) selecting one of said openings;
   (D) slidably inserting the second end portion of said post member into said one opening;
   (E) engaging said stop means with said surface so as to position the depth of said second end portion in said one opening;
   (F) positioning said safety belt means adapted to be around said person; and
   (G) connecting said hook means to said hook receiving means.

6. The method as defined in claim 5 further comprising the steps of:

(H) providing a second anchor constructed in accordance with said first anchor;
   (I) selecting a second opening;
   (J) slidably inserting said second anchor into said second opening;
   (K) engaging the stop means of said second anchor with said surface so as to position the depth of the second end portion of said second anchor in said second opening;
   (L) disconnecting said hook means from said first anchor; and
   (M) connecting said hook means to the hook receiving means of said second anchor.

7. The method as defined in claim 5 further comprising the steps of:

(H) removing said anchor from said one opening;
   (I) selecting a second opening;
   (J) slidably inserting the second end portion of said anchor into said second opening; and (K) engaging said stop means with said surface so as to position the depth of said second end portion in said second opening.

8. The method as defined in claim 5 in which said stop means is adapted for rotational sliding engagement with said surface, and in which said post member and said stop means and said hook receiving means are connected for simultaneous rotation in said one opening.

9. The method as defined in claim 5 in which said elongated post member is made from non-sparking material.

10. An anchoring system comprising:
 (A) a rock structure having
  (i) a generally upwardly facing surface, and
  (ii) a plurality of elongated openings extending downwardly from said surface;
 (B) a portable anchor having
  (i) an elongated post with an upper end portion and a lower end portion sized to be slidably positioned into said openings,
  (ii) stop means connected for engaging said surface to establish the depth of said lower end portion in said openings, and
  (iii) hook receiving means connected above said stop means; and
 (C) a harness having
  (i) a flexible tether line equipped with tether hook means adapted for connection with said hook receiving means of said anchor, and
  (ii) safety belt means connected to said tether line;
 such that said safety belt means is selectively anchored relative to one of said openings in which said post is slidably inserted.

11. The anchoring system as defined in claim 10 in which said post and said stop means and said hook receiving means are connected for simultaneous rotation.

12. The anchoring system as defined in claim 10 in which said anchor is made from a non-sparking material.

13. The anchoring system as defined in claim 10 in which said stop means is securely connected to said post between said upper and lower end portions, and in which said hook receiving means is connected to the upper end portion of the post above said stop means.

14. The anchoring system as defined in claim 10 in which said stop means and said hook receiving means are securely connected for rotation with said post.

* * * * *